UNITED STATES PATENT OFFICE.

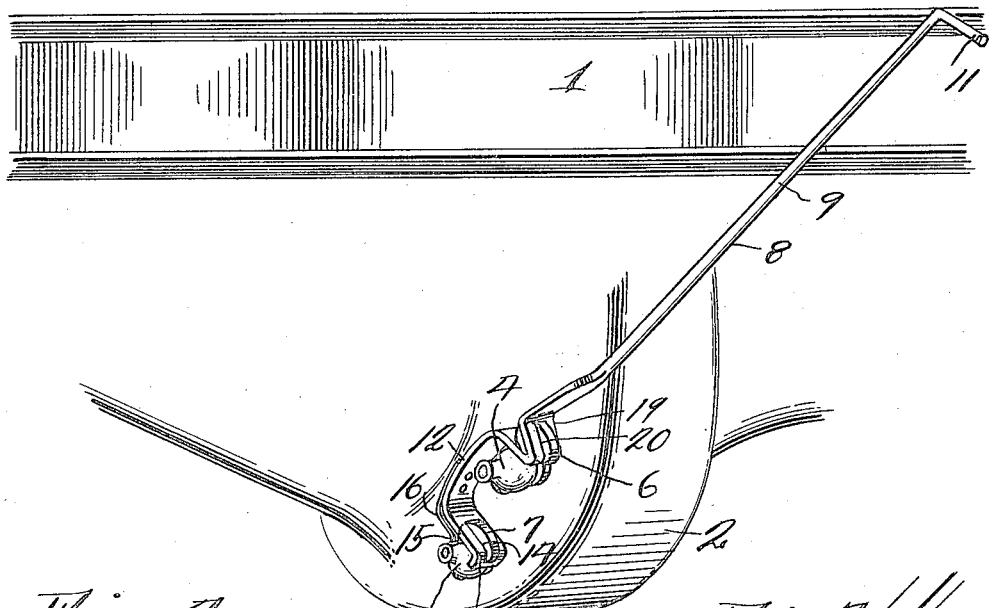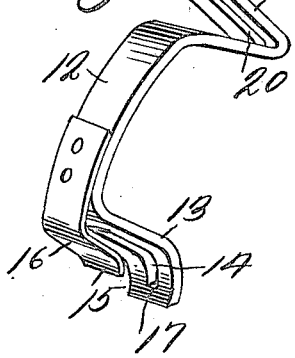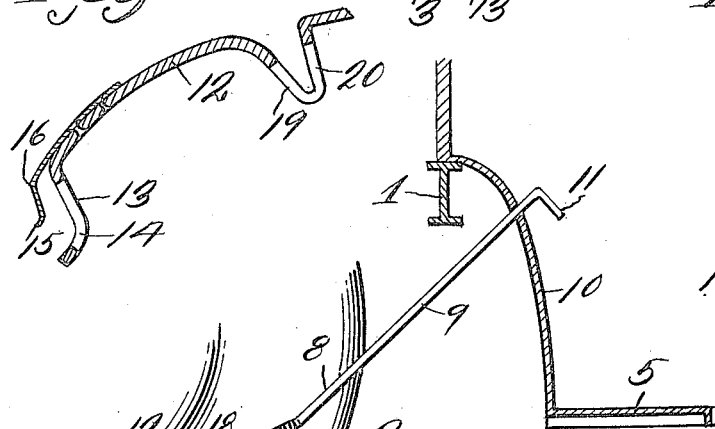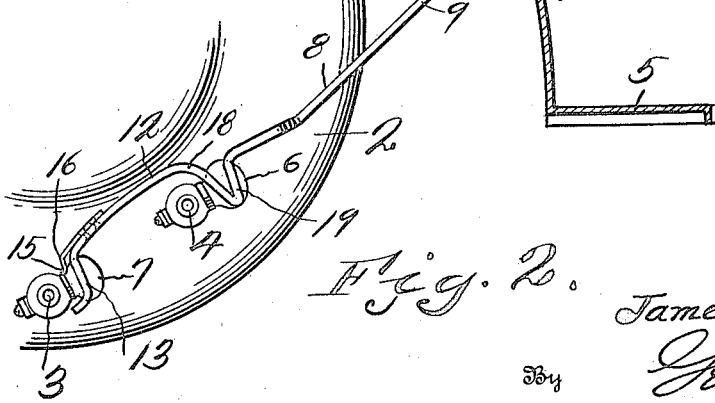

JAMES C. ROMINE, OF SOUTH BEND, INDIANA.

WRENCH.

1,403,199. Specification of Letters Patent. Patented Jan. 10, 1922.

Application filed September 16, 1921. Serial No. 501,155.

*To all whom it may concern:*

Be it known that I, JAMES C. ROMINE, a citizen of the United States, residing at South Bend, in the county of St. Joseph and State of Indiana, have invented certain new and useful Improvements in Wrenches, of which the following is a specification.

The invention relates to wrenches, and has for its object to provide a wrench, which is particularly adapted for simultaneously operating the valves of pet cocks carried by engine casings of automobiles, thereby allowing the testing of the oil level within the engine casing from a point adjacent the side of the automobile. At the present time it is necessary for the operator to kneel in order to reach the pet cocks carried by the crank casing of an automobile engine, which pet cocks are disposed beneath the engine and behind the mud guard of the automobile, therefore the pet cocks are placed where ready access to the same cannot be had, and as said pet cocks become dirty incident to grease and mud, the operator's hands are soiled during the oil level testing operation.

A further object is to provide a pet cock wrench for pet cocks of engine crank casings carried by motor driven vehicles, said wrench being formed from a single piece of material, the lower end of which is bent to form an apertured lug for the reception of the thumb piece of the lower pet cock and held thereon by a leaf spring engaging behind the upper side of said thumb member.

Also to provide said wrench with a downwardly extending V-shaped portion having a slot therein for the reception of the thumb piece of the upper pet cock and a handle member extending through the mud guard or to one side of the automobile and adapted to be grasped by the hand of the operator and partially rotated for simultaneously opening or closing the pet cocks.

With the above and other objects in view, the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a bottom perspective view of a portion of a conventional form of engine crank casing, showing the wrench applied to the pet cocks carried thereby.

Figure 2 is a rear elevation of a portion of the crank casing, showing the wrench applied thereto, and extending through a portion of the mud guard which is shown in section.

Figure 3 is a perspective view of the lower end of the wrench.

Figure 4 is a vertical longitudinal sectional view through the lower end of the wrench.

Referring to the drawing, the numeral 1 designates a side bar of an automobile frame and 2 an engine crank casing disposed below said bar. The engine crank casing 2 is of a conventional form wherein pet cocks 3 and 4 are provided, by means of which pet cocks the level of lubricant within the crank casing 2 may be ascertained. The usual method as at present used is for the operator to lean over or kneel adjacent the running board 5 and reach under the same and grasp the finger engaging member 6 of the upper valve 4, and then open said valve. After the valve 4 has been opened the operator grasps the finger engaging member 7 and opens the valve 3. If oil flows from the pet cock 4, the oil level is too high, as the oil level is maintained between the two pet cocks. If oil flows from the pet cock 3, the operator will know that sufficient oil is in the crank casing, and if no oil flows from the same, then it is necessary to replenish the oil within the crank casing. It will be seen that a wrench is necessary for this testing operation, which will simultaneously open both pet cocks, thereby allowing the operator to immediately observe the result. To accomplish this result a wrench 8 is provided, which wrench is formed from a single piece of material, preferably round adjacent its upper handle end portion 9, which extends through the mud guard 10, and terminates in a right angularly disposed hand engaging member 11, by means of which the wrench as a whole may be partially rotated, and flat adjacent its lower end. The lower end of the flattened portion 12 arches upwardly, inwardly and downwardly and terminates in a slotted arm 13, in the slot 14 of which the finger engaging member 7 is received and held by the engagement of the end 15 of a leaf spring 16 with the rear side of the finger engaging member 7. It will be seen that said leaf spring 16 in connection with the end 17 of the slot 14 will prevent displacement of the wrench as a whole and hold the same detachably but tightly to the finger engaging member 7, thereby preventing displacement of the wrench as the vehicle moves over rough ground, or for any other reason except when a vigorous pull is imparted on the wrench as a whole. The flattened portion 12 of the wrench arches over the pet cock 4, as shown at 18, and is provided with a downwardly extending V-shaped offset portion 19 which is vertically and longitudinally slotted for the reception of the finger engaging member 6, said slot being indicated by the numeral 20. It will be seen that when the operator grasps the handle member 11 and rotates the wrench outwardly that both pet cocks will be simultaneously opened by the turning of the finger engaging members 6 and 7, thereby allowing the operator to easily and quickly ascertain the lubricant level within the crank casing without reaching under the machine or kneeling on the ground adjacent the machine.

From the above it will be seen that a wrench is provided for crank casing pet cocks, which wrench is simple in construction, the parts reduced to a minimum and the main body thereof formed from a single piece of material.

The invention having been set forth what is claimed as new and useful is:—

1. A pet cock wrench comprising a body portion disposed to one side of spaced pet cocks having finger engaging members, one end of said body portion being provided with an angularly disposed slotted arm for the reception of the finger engaging member of one of the pet cocks, the other end of said body portion being provided with an offset V-shaped bend having a slot therein for the reception of the finger engaging member of the other pet cock, and a handle member whereby the wrench as a whole may be rocked.

2. A pet cock wrench for simultaneously opening and closing spaced pet cocks having finger engaging members, said wrench comprising a body portion disposed adjacent one side of said pet cocks, the end of said body portion being provided with a downwardly extending slotted arm for the reception of the finger engaging member of one of the pet cocks, a leaf spring carried by the body member and engaging said finger engaging member for holding the same in the slot of the slotted arm, the other end of said body member terminating in an offset slotted V-shaped portion for the reception of the finger engaging member of the other pet cock, said offset V-shaped portion terminating in a handle member adapted to be grasped by the operator.

3. The combination with spaced pet cocks having finger engaging members, of a wrench for simultaneously opening said pet cocks by rotating said finger engaging members, said wrench comprising a body portion having one of its ends terminating in an angularly disposed slotted arm for the reception of one of the finger engaging members, a spring for maintaining said finger engaging member in place, an offset slotted portion at the other end of the body portion for the reception of the finger engaging member of the other pet cock and a handle member carried by said body portion.

In testimony whereof I affix my signature.

JAMES C. ROMINE.